Jan. 15, 1935.  E. WERNER ET AL  1,988,406
DEMOUNTABLE WHEEL MOUNTING
Filed Nov. 22, 1933  2 Sheets-Sheet 1

WITNESSES
Edw. Thorpe
A.O. Foster

INVENTORS
Eugene Werner
Julius Kohn
Munn, Anderson, Stanley, Foster & Eddy
ATTORNEYS Jan. 15, 1935.  E. WERNER ET AL  1,988,406
DEMOUNTABLE WHEEL MOUNTING
Filed Nov. 22, 1933  2 Sheets-Sheet 2
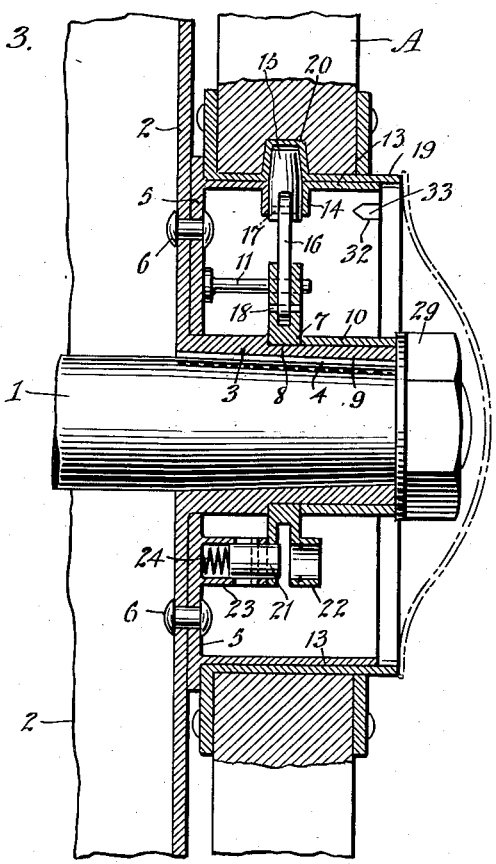
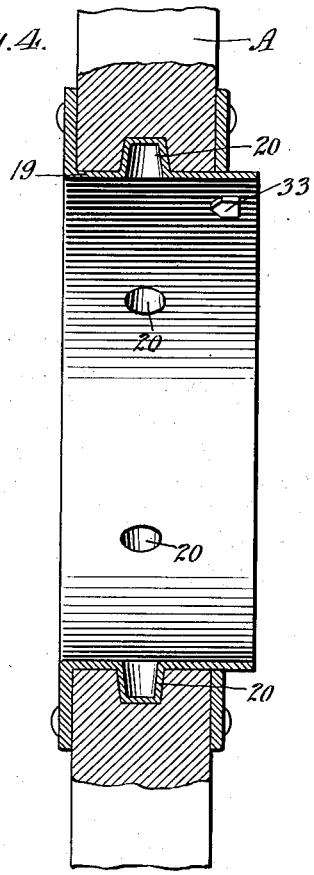
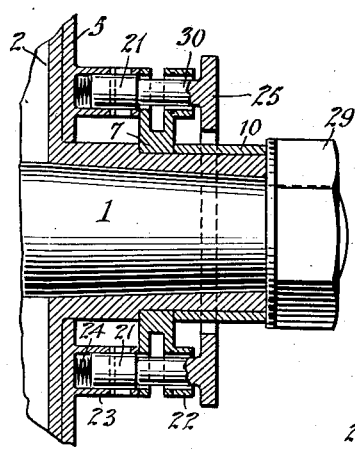
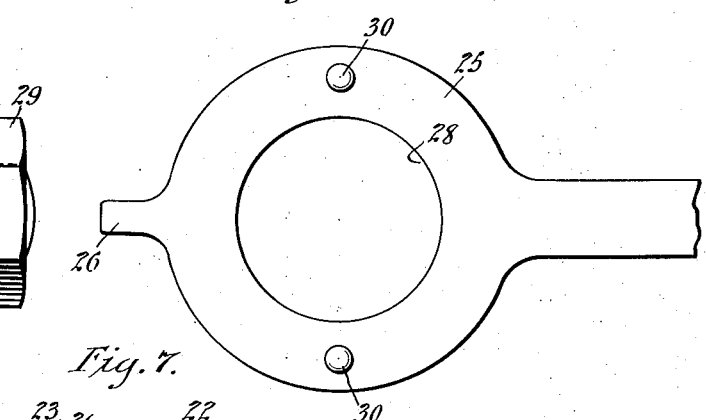
INVENTORS
Eugene Werner
Julius Kohn
ATTORNEYS Patented Jan. 15, 1935

1,988,406

UNITED STATES PATENT OFFICE 1,988,406

DEMOUNTABLE WHEEL MOUNTING

Eugene Werner and Julius Kohn, New York, N. Y.

Application November 22, 1933, Serial No. 699,240

2 Claims. (Cl. 301—9)

This invention relates to a demountable wheel mounting and lock, an object of the invention being to provide improved means for supporting and locking a demountable wheel whereby the wheel can be quickly removed and replaced by an authorized person with a proper tool.

A further object is to provide an article of this character which dispenses with the use of ordinary nuts and screw-threaded bolts, and which provides a single member which when turned in one direction projects a series of radial bolts into coupling engagement with a supporting drum and wheel hub, and when moved in the opposite direction retracts all of said bolts so that the wheel may be readily removed.

A further object is to provide a mounting of this character having an improved arrangement of lock which prevents the theft of the wheel.

With these and other objects in view, the invention consists in certain novel features of construction and combinations and arrangements of parts, all of which will be more fully hereinafter described and pointed out in the claims.

In the accompanying drawings—

Figure 3 is a view in section at right angles to Figure 1;

Figure 4 is a fragmentary view in vertical section of the wheel hub;

Figure 5 is a sectional detailed view illustrating the manner of operating the device with the employment of the proper tool;

Figure 6 is a view in elevation of the wrench shown in Figure 5; and

Figure 7 is a fragmentary detailed view illustrating the lock.

Figure 1:
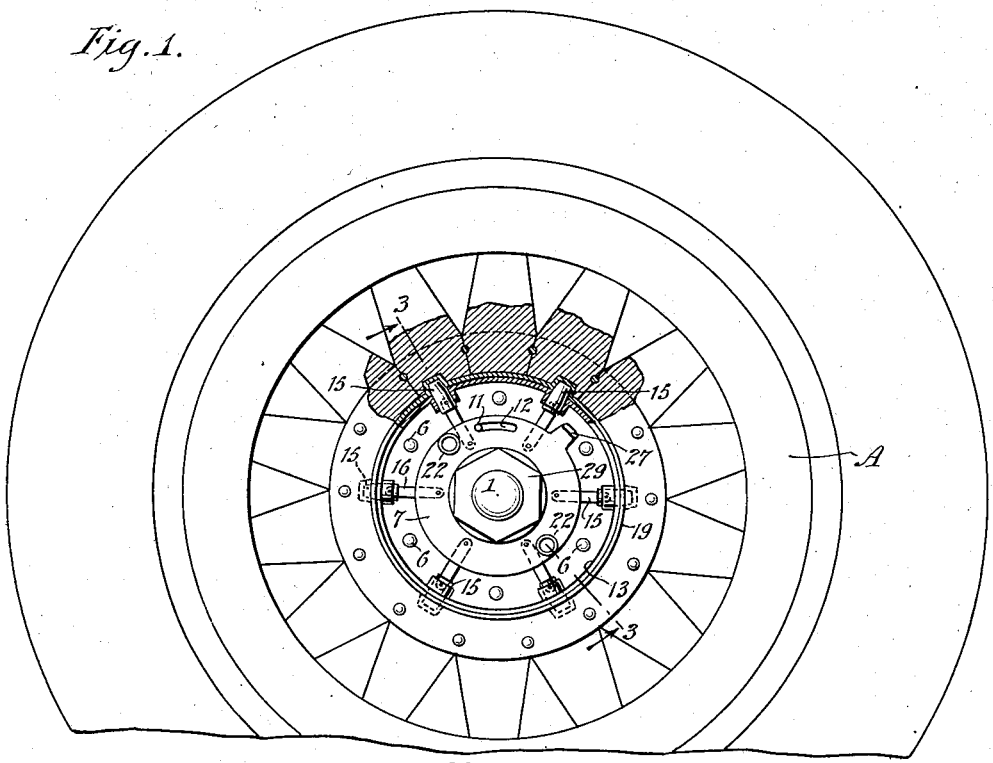
Figure 1 is a view in sectional elevation illustrating an improved mounting showing the bolts in projected locking or holding position.
Figure 2:
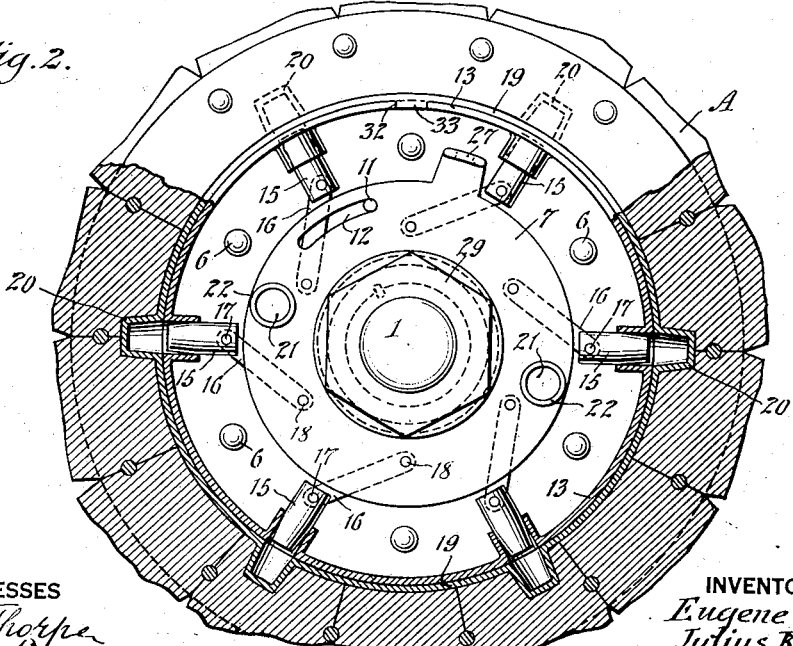
Figure 2 is a similar view on an enlarged scale showing the bolts in retracted position.

1 represents the axle of a vehicle, such as an automobile, to which a brake drum 2 is in fixed relation as, for example, by means of a sleeve 3 on the brake drum receiving the axle 1 and keyed thereto, as shown at 4. 5 represents our improved wheel supporting drum which is open at its front or outer portion and is closed at its inner portion, and may be secured to the drum 2 by rivets 6 or other securing means. A disk 7 is mounted to turn centrally in the drum 5 and we have illustrated one means of mounting this drum, which consists of providing the same with a central opening 8 receiving the cylindrical reduced outer portion 9 of the sleeve 3 with the member 10 on the sleeve holding the disk 7 against displacement. This particular mounting for the disk is, of course, capable of modification, the one essential feature being that the disk have rotary or turning movement within certain limits in the center of the drum 5, and in order to limit this turning movement a post 11 is fixed to the drum and projects through an arcuate slot 12 in the disk.

The cylindrical wall 13 of the drum 5 is provided with a circular series of open sleeves 14 in which bolts 15 are mounted. These bolts 15 are each connected by links 16 with the disk 7, said links having pivotal connection with the bolts, as illustrated at 17, and pivotal connection with the disk, as illustrated at 18.

The reference character A is employed to indicate generally a wheel, and this wheel has a hub 19 which is in the form of a sleeve fitting the cylindrical wall 13 of the drum so that the hub may be moved onto and off of the drum, as will more fully hereinafter appear. This hub 19 is formed with a circular series of radially projecting closed nipples 20 which are adapted to align with the sleeves 14 of the drum, and when the bolts 15 are projected into the nipples 20 the wheel will be securely held on the drum and coupled thereto.

The sleeves 14 and the nipples 20 have an internal taper and the bolts 15 have a corresponding taper, so that the bolts readily position themselves in the nipples and when projected there is a binding action to secure a coupling relationship between the drum and the wheel hub.

To prevent accidental turning movement of the disk, a pair of spring-pressed plungers 21 are mounted on the drum and are adapted to project into circular sockets 22 in the disk when the latter is turned to a position to project the bolts 15 into locking position. These plungers 21 are preferably mounted in barrels 23 fixed to the drum 5, with coil springs 24 in the barrels back of the plungers so that when the disk is turned to locking or holding position these plungers will spring into the open sockets 22 and hold the disk; hence, before the disk can be turned to retract the bolts 15 and release the wheel it is necessary that these plungers 21 be forced inwardly. To accomplish this, we employ a special type of wrench 25. This wrench 25 has a prong 26 at one end adapted to enter an eye 27 fixed to the disk adjacent one edge thereof and fulcrum in said eye. The wrench 25 has a central opening 28 to accommodate the axle 1, or more specifically the nut 29 screwed onto the end thereof, and at opposite sides the wrench is formed with pins 30 which are adapted to enter the sockets 22, and when the wrench is fulcrumed force the plungers 21 inwardly to release the disk, and while holding the plungers in this position the wrench can be turned to turn the disk and retract the bolts.

To prevent the possibility of theft a removable lock 31 may be provided which locks into one of the sockets 22 and cannot be removed except by the insertion of the proper key. Hence, when this lock is in one of the sockets the wrench cannot be used and the disk cannot be turned to retract the bolts.

In order to facilitate the proper positioning of the wheel hub 19 on the drum, so that the nipples 20 will align or register with the sleeves 14, the drum, or more specifically the cylindrical wall 13 thereof, may be formed with a notch 32 receiving an enlargement or key 33 on the wheel hub; hence, when the operator places the wheel hub on the sleeve he simply turns this hub until the key or enlargement 33 registers with the notch 32, and then he can press the hub completely on the drum and be sure that the bolt receiving members are in proper alignment. It is comparatively easy to turn the wheel after it is inserted on the drum so that it is a simple and easy operation to properly align the parts.

While we have described our improved mounting in connection with the axle of an automobile it is, of course, to be understood that the same arrangement of mounting would be utilized to care for the spare wheel; that is to say, the fifth drum would be utilized at the back of the automobile or elsewhere to support, receive and lock the spare wheel so that it may be connected and disconnected whenever occasion may require.

While we have illustrated what we believe to be the preferred embodiment of our invention, it is to be distinctly understood that various slight changes may be made with regard to the form and arrangement of parts without departing from our invention, and hence we do not limit ourselves to the precise details set forth but consider ourselves at liberty to make such changes and alterations as fairly fall within the spirit and scope of the claims.

What we claim is:

1. A wheel mounting including a drum, a wheel, a hub on the wheel adapted to fit the drum, a plurality of radially positioned bolts supported on the drum and adapted to be projected into the hub to secure the hub and the drum together, a rotary member in the drum, links connecting the rotary member and bolts whereby the turning movement of the rotary member serves to project or retract the bolts, a spring-pressed plunger in the drum, a socket in the rotary member receiving said plunger when the rotary member is in a position to project the bolts, so that before said rotary member can be turned to retract the bolts the plunger must be withdrawn, and a removable lock located in the socket which must be removed to afford access to the plunger.

2. A wheel mounting including a drum, a wheel, a hub on the wheel fitting the drum, means on the hub and wheel for centering the hub on the drum, locking means between the hub and the wheel, a disk mounted to turn in the drum and operatively controlling the locking means, a pair of open sockets at opposite sides of the disk, spring-pressed plungers adapted to spring into the sockets when the disk is in locking position, and an eye on the disk adapted to receive a wrench or operating member to permit the wrench to fulcrum to engage the spring-pressed plungers and release the disk to permit its turning movement.

EUGENE WERNER.
JULIUS KOHN.